United States Patent [19]
Kjeer et al.

[11] Patent Number: 6,054,790
[45] Date of Patent: Apr. 25, 2000

[54] V-BLOCK ARRANGEMENT FOR A DYNAMO-ELECTRIC MACHINE

[75] Inventors: Pete Kjeer; Darrell R. Morrison, both of Mankato, Minn.

[73] Assignee: Emerson Electric Co., St. Louis, Mo.

[21] Appl. No.: 09/274,541

[22] Filed: Mar. 23, 1999

[51] Int. Cl.$^7$ ...................................................... H02K 3/48
[52] U.S. Cl. ........................................... 310/214; 310/261
[58] Field of Search .................................... 310/214, 194, 310/261, 269

[56] References Cited

U.S. PATENT DOCUMENTS

| | | | |
|---|---|---|---|
| 894,015 | 7/1908 | Kishi et al. | 310/269 |
| 2,899,573 | 8/1959 | Wesolowski | 310/60 R |
| 3,739,212 | 6/1973 | Koelbel et al. | 310/194 |
| 4,268,773 | 5/1981 | Beck et al. | 310/269 |
| 4,409,502 | 10/1983 | McCabria | 310/61 |
| 5,036,238 | 7/1991 | Tajima | 310/214 |
| 5,086,246 | 2/1992 | Dymond et al. | 310/269 |

OTHER PUBLICATIONS

Morrison, et al., Rotor V–Block Assembly, U.S. Patent Application No. 09/158,368, filed Sep. 22, 1998.

*Primary Examiner*—Nestor Ramirez
*Assistant Examiner*—Joseph Waks

[57] ABSTRACT

A V-block with a preselected shape defining a preselected included angle between a pair of V-block side portions is connected to a laminated spider of a rotor at preselected location between spaced apart adjacent poles of the rotor by disposing an elongated connecting piece in a slot longitudinally disposed in the spider and connecting the elongated connecting piece to the V-block by a fastener. Applying a preselected torque to the fastener establishes a predetermined force between the V-block and the conductive windings disposed about adjacent poles. The V-block arrangement is particularly suited for use in a dynamo-electric machine.

14 Claims, 6 Drawing Sheets

V-BLOCK ARRANGEMENT FOR A DYNAMO-ELECTRIC MACHINE

TECHNICAL FIELD

This invention generally relates to a rotor of a dynamo-electric machine and more particularly to a V-block arrangement for maintaining windings in position about poles of the rotor of the dynamo-electric machine and method of assembly thereof.

BACKGROUND ART

A V-block with relatively adjustable sides forcibly maintains the windings of adjacent poles of a rotor of a dynamo-electric machine, such as an electric motor, generator and the like, in position on the poles during rotation of the rotor. A plurality of adjustable V-blocks spaced axially along the length of the rotor and engaged with the windings is required to adequately maintain the windings in position on the poles during rotation of the rotor.

It has been found difficult to accurately adjust the included angle between the sides of each adjustable V-block properly in order to maintain an equal force against the windings. It has also been found that adjustment of the included angle between the sides of a V-block is time consuming and difficult to achieve in its own right. In some rotors more than 100 V-blocks are required making the total adjustment time excessive.

Through practice, it has been found, that welding the rotor laminations together, drilling and tapping the welded rotor laminations, and threading a bolt into the tapped hole to retain the V-block is also unsatisfactory. Such a process is time consuming and costly and results in localized high stresses in the welded laminated rotor at the tapped hole. Such stresses may cause failure of the laminated rotor during operation thereof.

The subject invention is directed at overcoming one or more of the problems set forth above.

DISCLOSURE OF THE INVENTION

In one aspect of the present invention, a V-block arrangement for a rotor of a dynamo-electric is provided. The rotor has a spider, a plurality of spaced apart poles disposed in a circular array around the spider, a plurality of conductive windings encircling the poles, and an axis of rotor rotation. The V-block arrangement has a V-block with a predetermined fixed shape. The V-block is disposed between a pair of said spaced apart poles. A slot which extends in a direction substantially parallel to the axis of rotation of the rotor is disposed in the spider at a location between the pair of spaced apart poles. An elongated connecting piece is disposed in the slot. A fastener extending radially relative to the axis of rotation connects the elongated connecting piece to the V-block.

The V-block being connected to the elongated connecting piece disposed in a slot in the spider eliminates individual boring and tapping of the laminated rotor and the stresses associated with such a construction.

The V-block having a predetermined fixed shape eliminates the need for the difficult relative adjustment of the included angle of the V-block sides.

The fastener connecting the elongated connecting piece to the V-block provides for ease of access and the accuracy of adjustment of the radial position of the V-block relative to the rotor and thereby the resultant force of the V-block being applied to the windings.

BEST MODE FOR CARRYING OUT THE INVENTION

Figure 1:
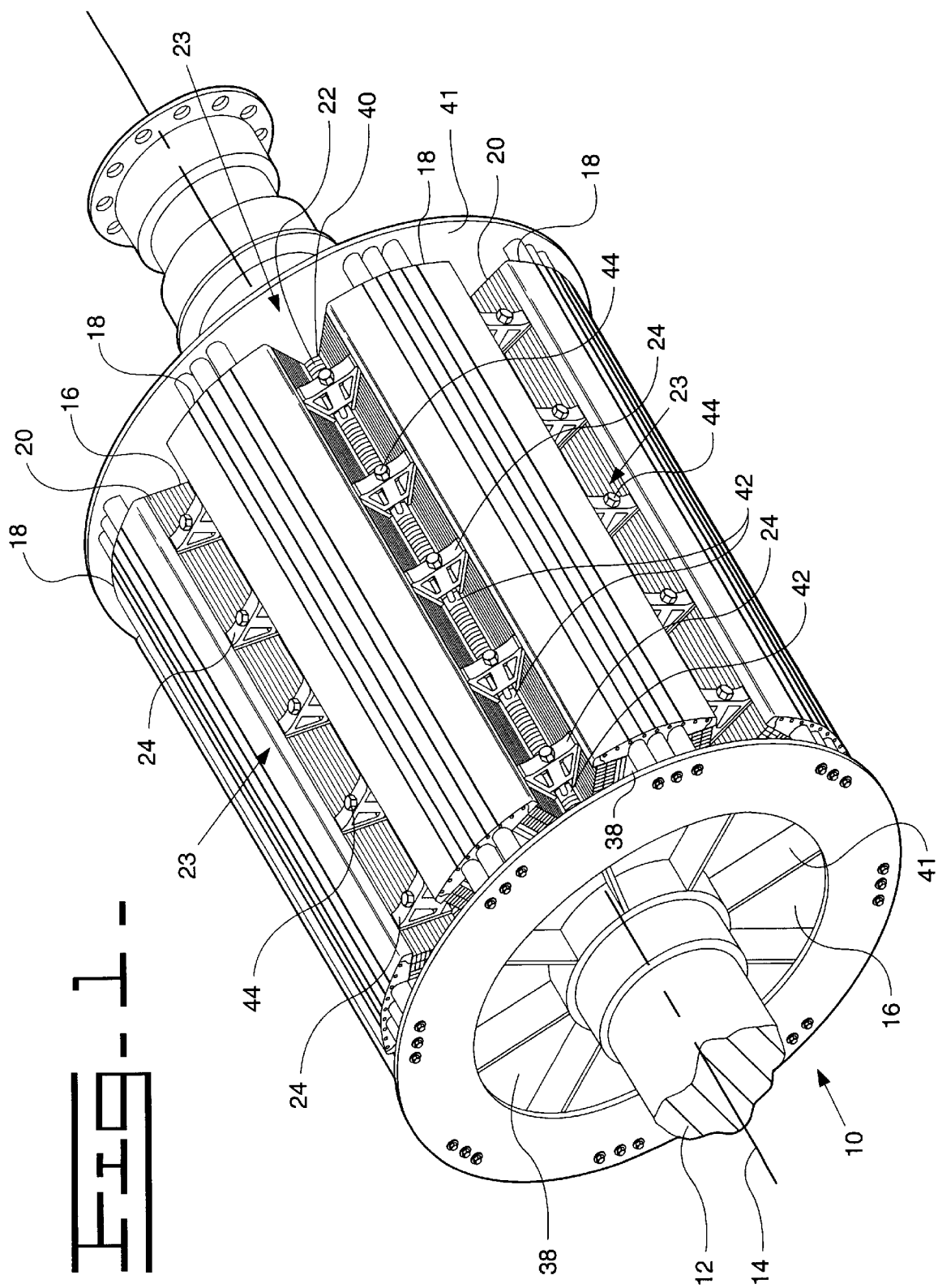
FIG. 1 is a diagrammatic isometric view of a rotor assembly showing an embodiment of the V-block arrangement of the present invention.
Figure 2:
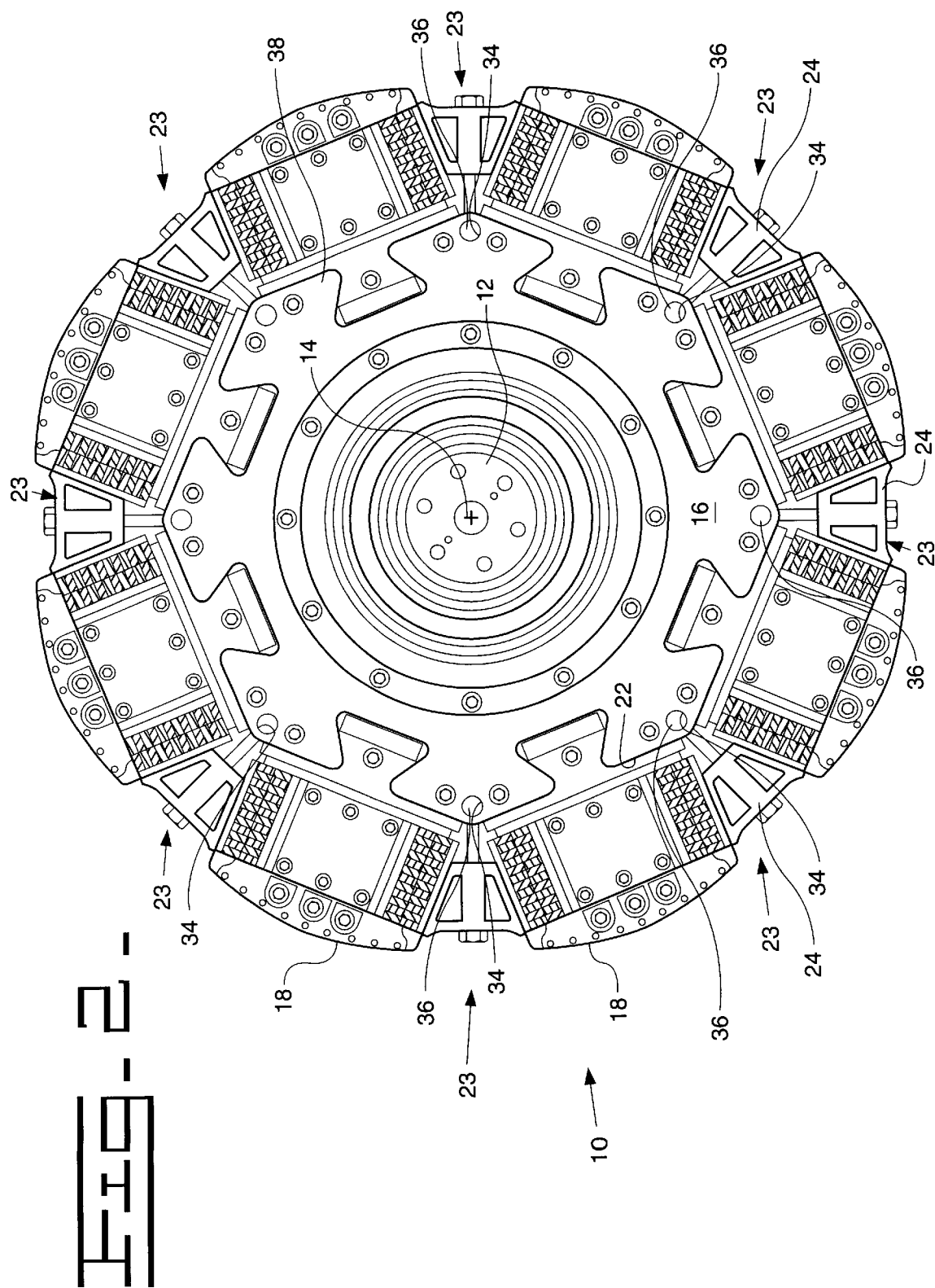
FIG. 2 is a diagrammatic end view of FIG. 1.

With reference to the drawings and in particular FIGS. 1–4, a rotor 10 for a dynamo-electric machine (not shown) is shown in detail. The particular rotor 10 depicted is for use in an electric generator. However, other applications including electric motors and the like are considered within the field of use of this invention.

The rotor 10 has a shaft 12 defining an axis of rotor rotation 14, a spider 16 with a plurality of spaced apart poles 18 disposed in a circular array equally around the spider 16. A plurality of conductive windings 20 encircle the poles 18. The spider 16 consists of a plurality of lamination plates 22 stacked together defining the axial length of the spider 16. The poles 18 are laminated and connected to the laminated plates 22 of the spider 16.

A V-block arrangement 23 having a plurality of identical V-blocks 24 with a predetermined fixed shape is disposed between each pair of the spaced apart poles 18. The V-blocks 24 are spaced a predetermined distance apart along the length of the spider 16. The spacing and quantity is determined as a function of the number required to adequately support the conductive windings 20. Preferably, the V-blocks are equally spaced. The V-blocks 24 have a pair of side portions 26,28, an apex end portion 30 at a connection of the pair of side portions 26,28 and a strut end portion 32 spaced from the apex end portion 30. The strut end portion 32 is rigidly connected to and between the pair of side portions 26,28 and maintains the pair of side portions 26,28 at a preselected included angle "a" relative to each other and provides no relative angular side adjustment. Preferably, the V-blocks 24 are formed in one piece from a material having adequate strength, manufacturability, and low cost, such as aluminum.

A slot 34 is disposed in the spider 16 between each pair of spaced apart poles 18. The slot 34 may be formed by stamping, machining or any other suitable process. The slots 34 extend in a direction substantially parallel to the axis of rotor rotation 14 and the full length of the spider 16.

An elongated connecting piece 36 is disposed in each slot 34. Each elongated connecting piece 36 is preferably shorter in length than the length of the slot 34 in order to accommodate generous tolerances and to insure that the elongated connecting piece 36 does not extend past opposite ends of the spider 16. Each elongated connecting piece 34 is positioned into the slot 34 from an end 38,40 of the spider 16.

As shown in the embodiment of FIGS. 1–3 and 5, each elongated connecting piece 36 and each slot 34 is circular in cross-section and preferably round. The each circular elongated connecting piece 36 is slidably disposed in a circular shaped slot 34 to facilitate assembly and disassembly.

Figure 4:
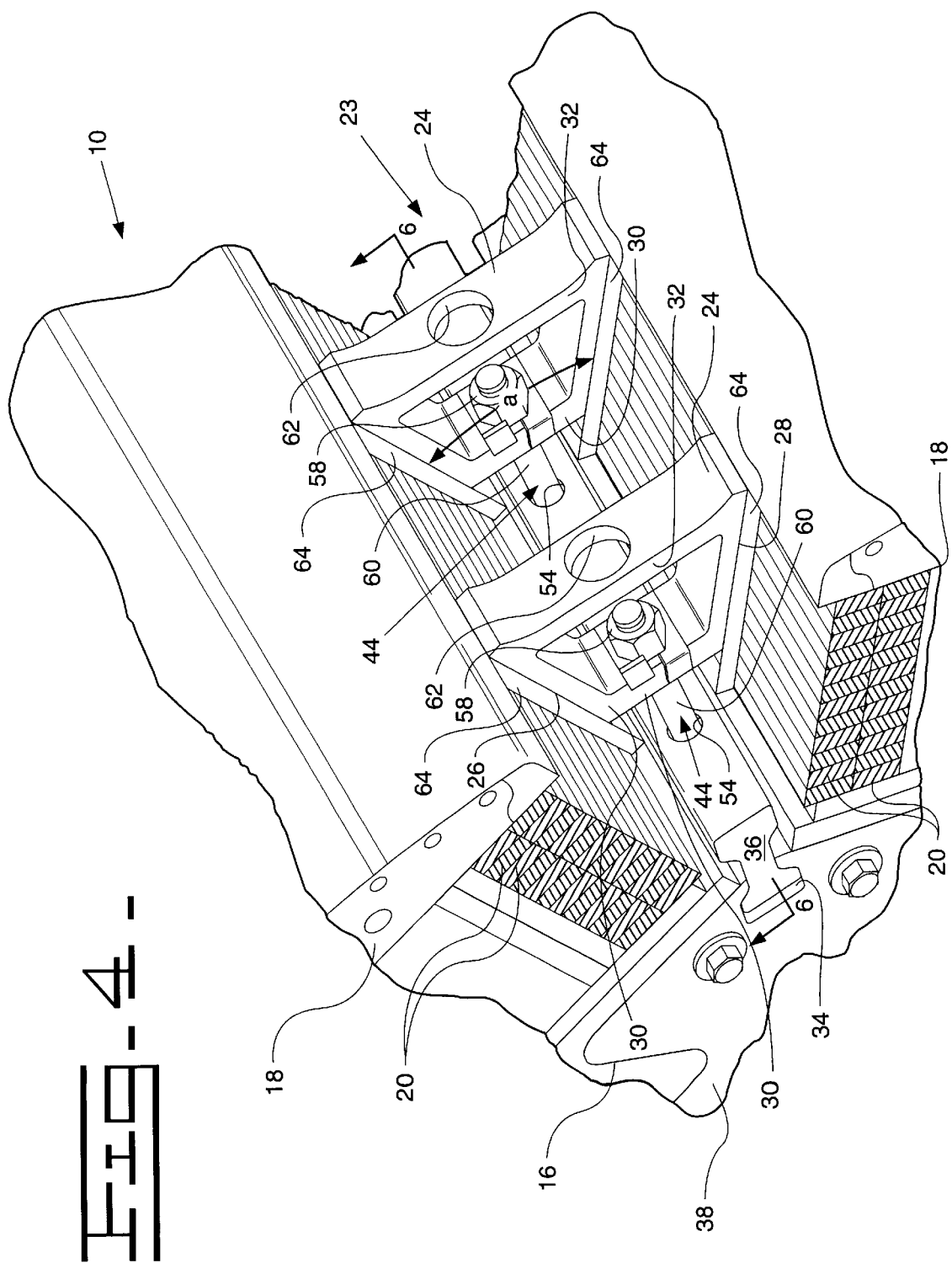
FIG. 4 is a diagrammatic isometric view of another embodiment of the V-block arrangement of the present invention.
Figure 6:
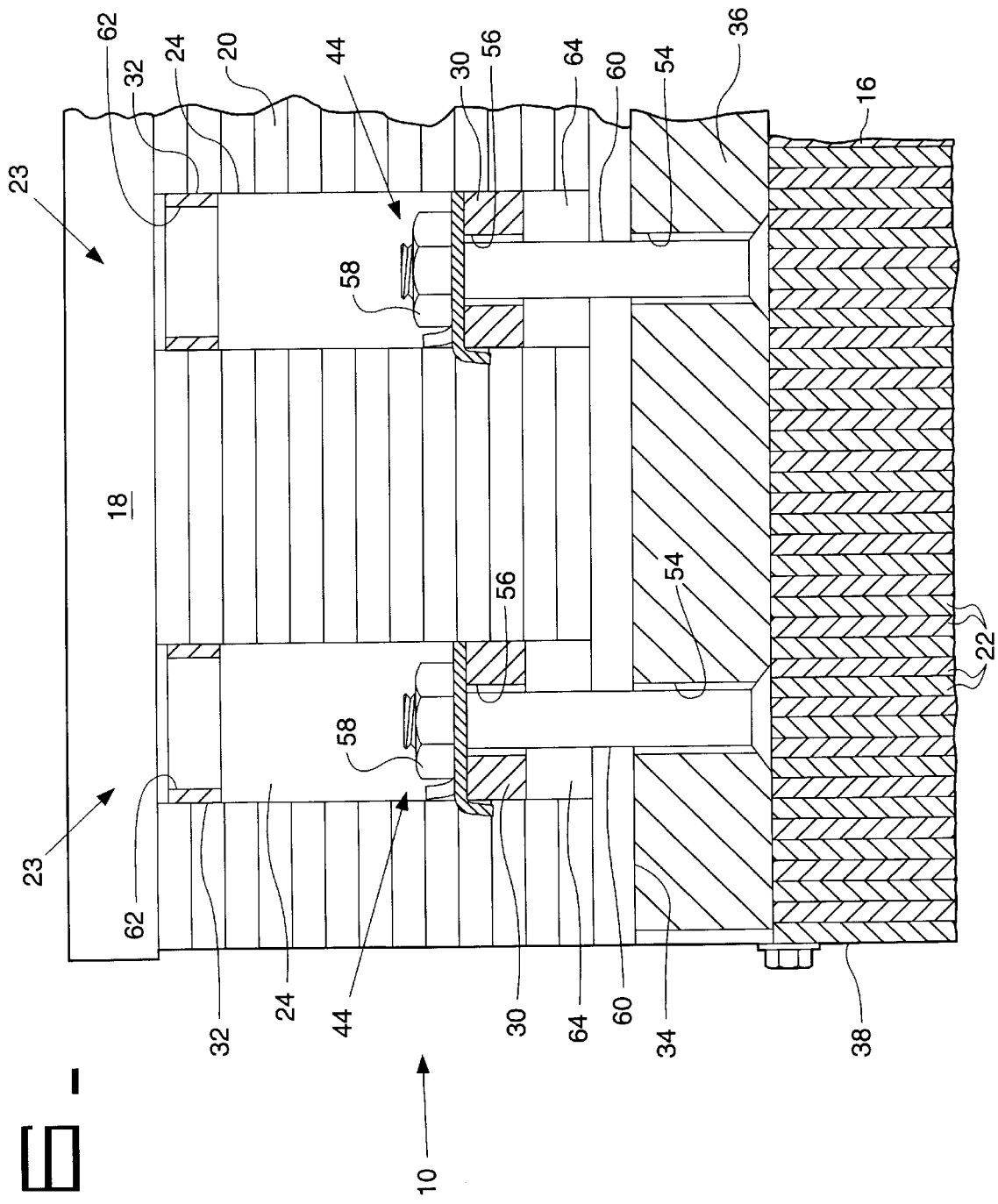
FIG. 6 is a diagrammatic cross-sectional view taken along lines 6—6 of the V-block arrangement of FIG. 4.

As shown in the embodiment of FIGS. 4 and 6, the elongated connecting piece 36 and the slot 34 are dovetail shaped in cross-section. The elongated dovetail shaped connecting piece 36 is slidably disposed in a receiving dovetail shaped slot 34 to facilitate assembly. With respect to this invention, a dovetail includes other non-round shapes capable of retaining a member from radial movement, for example, a fir tree shape, a "T" shape, and the like.

Figure 3:
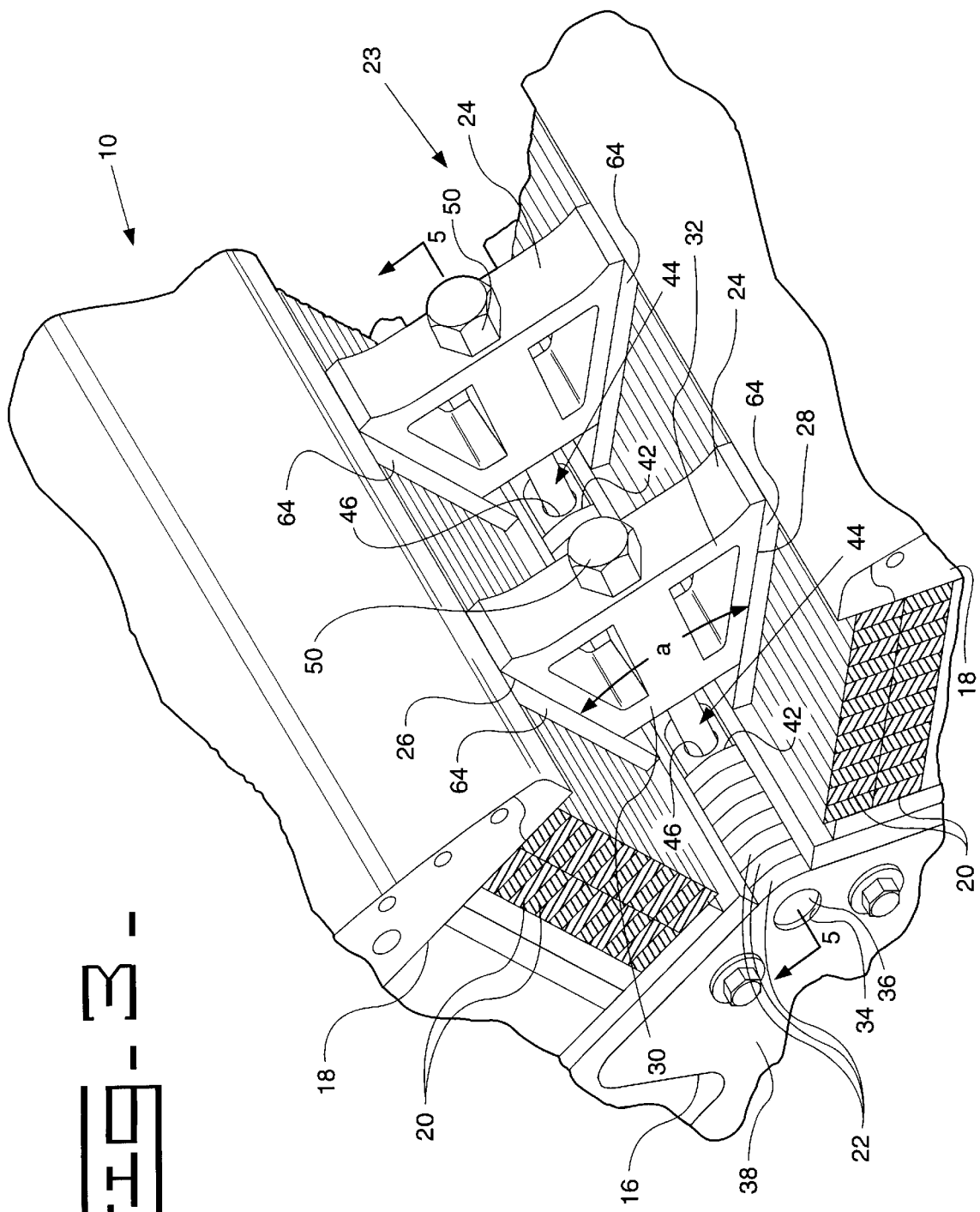
FIG. 3 is a diagrammatic isometric view of one embodiment of the V-block arrangement of the present invention.

As best seen in FIGS. 1 and 3, the spider 16 has a plurality of spaced apart radial apertures 42 disposed radially therein relative to the axis of rotor rotation 14. The radial apertures 42 are substantially equally spaced in a direction along the length of the spider 16 and lie radially between pairs of spaced apart poles 18. The radial apertures 42 preferably bisect the angular space between poles 18 and open into the slots 34. It is noted that the radial apertures 42 are defined between stacks of lamination plates 22 so as to not to produce stress risers in the spider 16. The number of radial apertures 42 is a function of the number of V-blocks 24 selected above. The size of each radial aperture 42 is sufficient to loosely receive a fastener 44 hereinafter discussed.

As best seen in FIGS. 3 and 4, fasteners 44, extending radially relative to the axis of rotor rotation 14, adjustably connects the V-blocks 24 to the elongated connecting pieces 36. The fasteners 44 forcibly urge the V-blocks 24 toward the axis of rotor rotation 14 and apply a predetermined force to the conductive windings 20 encircling adjacent poles 18. In the embodiment of FIG. 3, the elongated connecting pieces 36 are retained sandwiched between opposite ends (FIG. 1) of the spider 38,40 by a fan blade assembly 41 connected to the spider 16 at the opposite ends 38,40.

Figure 5:
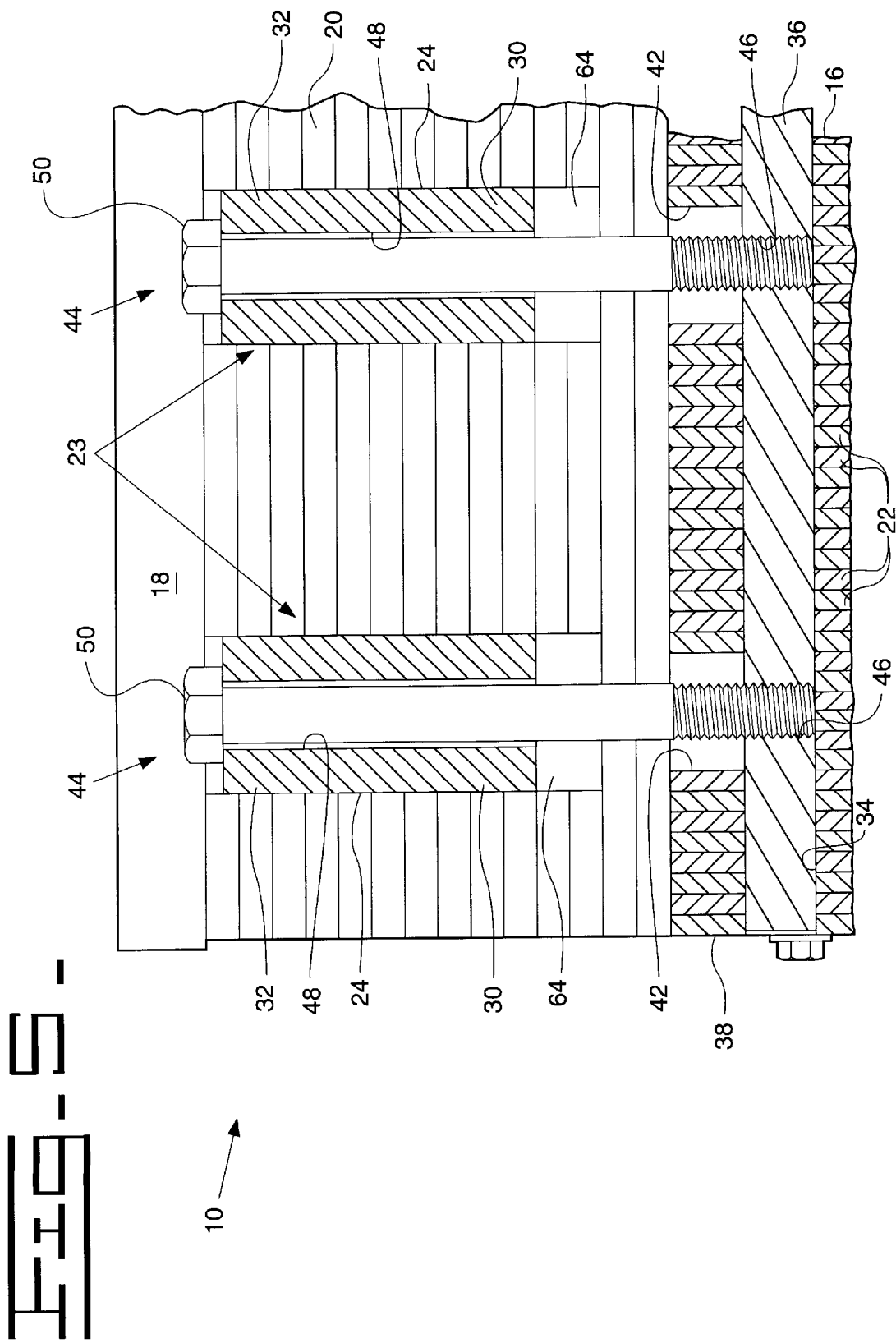
FIG. 5 is a diagrammatic cross sectional view taken along lines 5—5 of the V-block arrangement of FIG. 3.

Referring to FIGS. 3 and 5, the fasteners 44 are movably and loosely disposed in the radial apertures 42. A plurality of threaded apertures 46 are disposed in the elongated connecting piece 36 at predetermined spaced apart locations along the elongated connecting piece 36 corresponding to the V-block 24 spacing discussed above. It is noted that, the fasteners 44 and the sides of the radial apertures 42 may engage each other and thereby maintain the elongated connecting piece 36 from axial movement in the slot 34 without the aid of the fan blade assembly 41.

As best seen in FIG. 5, a clearance aperture 48 opening at the the strut and apex end portions 30,32 is disposed in the V-block 24. The fastener 44 which is shown as a bolt 50, but not limited thereto, is slidably disposed in the clearance aperture 48, screwthreadably connected to the threaded aperture 46 in the elongated connecting piece 36, and engageable at a head end of the bolt 50 with the strut end portion 32 of the V-block 24.

Referring to FIGS. 4 and 6, a plurality of clearance apertures 54 are disposed in the elongated connecting piece 36 at predetermined spaced apart locations along the elongated connecting piece 36 corresponding to the V-block 24 spacing discussed above.

As best seen in FIG. 6, a clearance aperture 56 is disposed in the apex end portion 30 of the V-block 24. The fastener 44, shown as a machine screw 60, but not limited thereto, is slidably loosely disposed in the clearance apertures 54,56 disposed in the elongated connecting piece 36 and the apex portion 30 respectively. It is to be noted that each aperture 54 may be threaded and the machine screws 60, threaded along the length thereof, are screw threadably engaged with the threaded apertures 54. This threaded engagement retains the machine screws 60 in position and assists in assembly. A nut 58 which is screwthreadably connected to the machine screw 60 is engageable with the apex end portion 30 of the V-block 24. A service clearance aperture 62 is disposed in the strut end portion 32 to facilitate access to the nut 58. In particular, the service clearance aperture provides access for a socket of a wrench (not shown). As seen in FIGS. 1–6, a pair of spaced apart insulating blocks 64 of a non-conductive insulating material are disposed between the V-blocks 24 and the respectively adjacent poles 18. The insulating material which is non conductive permits a conductive V-block material, such as aluminum, to be utilized. Each side portion 26,28 of the V-block 24 engages one of the insulating blocks 64 and urges the insulating blocks 64 towards a respective one of the spaced apart poles 18. In particular, the pair of spaced apart blocks 64 are urged to engage a conductive windings 20 encircling the adjacent poles 18 to maintain the windings 20 in position on the poles 18.

Industrial Applicability

With reference to the drawings and in operation, the V-block arrangement 23 maintains the conductive windings 20 in position on the poles 18 of the laminated spider 16 and from excessive relative movement during rotation of the rotor 10 about the axis of rotor rotation 14.

The V-blocks 24 having a predetermined fixed shape insures that the fixed included angle of the pair of side portions 26,28 of the V-blocks 24 is maintained constant under all loading conditions. This enables ease of adjustment of each of the V-blocks 24 and simplicity of assembly and disassembly. Since the retaining force of the V-blocks 24 applied against the conductive windings is proportional to the torque applied to the fasteners 44, adjustment of each of the V-blocks 24 is easily achieved. To apply a consistent force between each of the V-blocks and the conductive windings one simply applies adjustment torque to each fastener 44 of an equal magnitude.

The elongated connecting piece 36 disposed in the slot 34 eliminates the need for drilling and tapping the spider 16. This eliminates the stress risers associated with the drilled and tapped spider 16. Since the elongated connecting piece 36 distributes the load applied by the fasteners substantially along the length of the elongated connecting piece 34 disposed in the slot 34 localized stresses in the spider are substantially reduced.

The construction of the V-block arrangement 23, including ease of access to the threaded fasteners 44, facilitates ease of connection and removal of the V-blocks 24 not present in other arrangements.

Connection of the V-blocks 24 to the spider 16 is achieved simply by disposing the elongated connecting piece 36 in the slot 34 connecting the V-blocks 24 to the elongated connecting piece 36 by the fasteners 44, installing the insulating blocks 64 between the V-blocks 24 and the conductive windings 20, and applying a tightening torque to the fasteners 44 of a preselected amount.

In the embodiment shown in FIG. 5, the fasteners 44 are threaded into the threaded aperture 46 disposed in the elongated connecting piece 36 subsequent to disposition of the elongated connecting piece 36 in the slot 34.

In the embodiment shown in FIG. 6, the fasteners 44 are inserted in the clearance apertures 54 in the elongated connecting piece 36 prior to insertion of the elongated connecting piece 36 into the slot 34. As noted above the, the apertures 54 may be threaded and the fasteners 44 may be screwthreaded into the apertures 54 prior to insertion of the elongated connecting piece 36 into the slot 34.

Other aspects, objects and advantages of this invention can be obtained from a study of the drawings, the disclosure and the appended claims.

We claim:

1. A V-block arrangement for a dynamoelectric machine having a rotor, said rotor having a spider, a plurality of spaced apart poles disposed in a circular array around the spider, a plurality of conductive windings encircling the poles, and an axis of rotor rotation; comprising:

a plurality of V-blocks having a predetermined fixed shape and being disposed between a pair of said spaced apart poles;

a slot disposed in said spider between said pair of spaced apart poles, said slot extending in a direction substantially parallel to the axis of rotor rotation;

an elongated connecting piece disposed in said slot;

a plurality of fasteners extending radially relative to said axis of rotation and adjustably connecting said elongated connecting piece to said plurality of V-blocks.

2. The V-block arrangement, as set forth in claim 1, wherein said spider includes apertures disposed radially therein and opening into the slot, said fasteners being disposed in the radial apertures.

3. The V-block arrangement, as set forth in claim 2, wherein said fasteners are slidably and loosely disposed in the radial apertures.

4. The V-block arrangement, as set forth in claim 2, wherein at least one of said V-blocks includes a pair of side portions, an apex end portion at a connection of the pair of side portions, and a strut end portion spaced from the apex end portion and rigidly connected to and between the pair of side portions, said strut maintaining the pair of side portions at a preselected angle relative to each other.

5. The V-block arrangement, as set forth in claim 4, including a pair of spaced apart blocks of a non-conductive insulating material, wherein said V-block is disposed between the pair of spaced apart blocks such that the side portions of the V-block engage said pair of blocks and urge said pair of blocks toward a respective one of said pair of spaced apart poles.

6. The V-block arrangement, as set forth in claim 5, wherein said pair of spaced apart blocks engage a respective pole winding encircling the respective poles.

7. The V-block arrangement, as set forth in claim 5, wherein said spider includes a plurality of laminations being stacked to define an axial length of said spider.

8. The V-block arrangement, as set forth in claim 4, wherein said fastener corresponding to the at least one V-block forcibly urges said V-block having said predetermined fixed shape toward the axis of rotor rotation and applying a predetermined force to the windings encircling the respective pair of adjacent poles.

9. The V-block arrangement, as set forth in claim 8, wherein having a preselected axial length, said slot extending the length of the spider, and said elongated said slot has a second axial length, said elongated connecting piece has a third axial length, and wherein the second axial length is longer than the third axial length.

10. The V-block arrangement, as set forth in claim 9, wherein said elongated connecting piece and said slot are circular in a cross section taken perpendicular to said axis of rotor rotation and said elongated circular connecting piece is slidably disposed in the circular shaped slot.

11. The V-block arrangement, as set forth in claim 10, including:

a threaded aperture disposed in the elongated connecting piece;

a clearance aperture disposed in the V-block and opening at the strut and apex portion end portions the V-block, said fastener being screwthreadably connected in the threaded aperture in said elongated connecting piece, slidably disposed in the clearance aperture in the strut portion of the V-block, and engageable with the strut portion of the V-block.

12. The V-block arrangement, as set forth in claim 9, wherein said elongated connecting piece and said slot are dovetail-shaped in a cross-section taken perpendicular to said axis of rotor rotation, and said elongated dovetail-shaped connecting piece is slidably disposed in the dovetail-shaped slot.

13. The V-block arrangement, as set forth in claim 12, including:

a clearance aperture disposed in the apex portion of the V-block;

a clearance aperture disposed in the elongated connecting piece, wherein said fastener is a bolt which is slidably loosely disposed in the clearance aperture in each of said elongated connecting piece and said apex portion; and a nut screwthreadably connected to the bolt and engageable with the apex portion of the V-block.

14. The V-block arrangement, as set forth in claim 13, including a clearance aperture disposed in the strut portion, said nut being accessible through the clearance aperture in the strut portion.

\* \* \* \* \*

UNITED STATES PATENT AND TRADEMARK OFFICE
CERTIFICATE OF CORRECTION

PATENT NO. : 6,054,790  
DATED : April 25, 2000  
INVENTOR(S) : Pete Kjeer and Darrell R. Morrison Page 1 of 1

It is certified that error appears in the above-identified patent and that said Letters Patent is hereby corrected as shown below:

Claim 9, column 6,
Lines 5-6, delete "having a preselected axial length, said slot extending the length of the spider, and said elongated".

Signed and Sealed this

Eighteenth Day of September, 2001

Attest:

Attesting Officer

NICHOLAS P. GODICI  
Acting Director of the United States Patent and Trademark Office